United States Patent
Liu

(10) Patent No.: US 7,161,475 B2
(45) Date of Patent: Jan. 9, 2007

(54) [SPEED-LIMIT SETUP METER]

(75) Inventor: Hsu-Ming Liu, Taipei (TW)

(73) Assignee: Trisco Technology Corp., Taipei (TW)

( * ) Notice: Subject to any disclaimer, the term of this patent is extended or adjusted under 35 U.S.C. 154(b) by 165 days.

(21) Appl. No.: 10/905,614

(22) Filed: Jan. 13, 2005

(65) Prior Publication Data

US 2006/0164224 A1    Jul. 27, 2006

(51) Int. Cl.
*B60Q 1/00* (2006.01)
(52) U.S. Cl. .................. 340/441; 340/425.5; 340/438; 340/439; 340/461; 340/815.4; 340/815.45; 340/936
(58) Field of Classification Search ............... 340/441, 340/425.5, 438, 439, 461, 462, 815.4, 815.45, 340/936; 362/23, 26, 31; 116/62.1, 286
See application file for complete search history.

(56) References Cited

U.S. PATENT DOCUMENTS

| 5,121,109 | A  | * | 6/1992 | Murphy et al. ............. 340/688 |
| 6,404,333 | B1 | * | 6/2002 | Ayres et al. ................ 340/461 |
| 6,531,958 | B1 | * | 3/2003 | Kabatek et al. .......... 340/425.5 |

* cited by examiner

*Primary Examiner*—Hung Nguyen

(57) ABSTRACT

A speed-limit setup meter includes a meter, which has a housing, a mounting frame at the bottom side of the housing, and a faceplate at the front side of the housing, a link pivotally mounted inside the housing, a pointer fixedly fastened to the front end of the link and kept in proximity to the speed-limit setup meter, and an adjustment device fixedly fastened to the rear end of the link outside the rear side of the housing for turning with the hand to rotate the pointer over the speed-limit setup meter.

3 Claims, 6 Drawing Sheets

[SPEED-LIMIT SETUP METER]

BACKGROUND OF THE INVENTION

1. Field of the Invention

The present invention relates to a meter and more particularly, to a speed-limit setup meter, which has the pointer and the adjustment device disposed at two opposite sides of the meter so that the user can see the indication of the meter when rotating the adjustment device to adjust the position of the pointer.

2. Description of the Related Art

A variety of meters and gauges are known for measuring the amount or speed of fluid or gas, or for indicating direction or time. For example, a motor vehicle generally has a fuel indicator/gas gauge to indicate the amount of fuel oil, an oil pressure gauge to indicate the pressure of fuel oil, an engine temperature gauge to indicate engine temperature, a tachometer to measure engine speed, and an odometer to measure the distance the distance traveled by the vehicle. A meter generally uses a pointer to indicate the amount or value measured. In additional to vehicle internal meters/gauges, a car driver may attach a meter to the inside of the car for car performance setup indication. For example, a car driver may install an attached meter for setting up a speed limit. When the speed of the car surpassed the setup value, the attached meter immediately gives a warning signal to the car driver. FIGS. 5 and 6 show a speed-limit setup meter according to the prior art. According to this design, the meter A comprises a speed-limit setup meter A11 on a faceplate A1, a pointer A3 pivoted to the speed-limit setup meter A11, and a knob A2 for driving by hand to turn the pointer A3 relative to the speed-limit setup meter A11. This design of speed-limit setup meter is still not satisfactory in function due to the following drawbacks.

1. Because the knob A2 is provided at the front side of the speed-limit setup meter A11, it obstructs the sense of beauty of the meter and tends to be touched by the car driver to bias the pointer accidentally.

2. When rotating the knob A2 with the hand, the hand will hinder the sight viewing the indication of the meter A at the speed-limit setup meter A11.

3. Because the pointer A3 is kept spaced from the graduations at the speed-limit setup meter A11 at a certain distance, the car driver may be unable to read the indication of the pointer A3 accurately.

SUMMARY OF THE INVENTION

The present invention has been accomplished under the circumstances in view. It is therefore the main object of the present invention to provide a speed-limit setup meter, which has the pointer and the adjustment device disposed at two opposite sides of the meter so that the user can see the indication of the meter when rotating the adjustment device to adjust the position of the pointer. According to one aspect of the present invention, the speed-limit setup meter comprises a meter, which has a housing, a mounting frame at the bottom side of the housing, and a faceplate at the front side of the housing, a link pivotally mounted inside the housing, a pointer fixedly fastened to the front end of the link and kept in proximity to the speed-limit setup meter, and an adjustment device fixedly fastened to the rear end of the link outside the rear side of the housing for turning with the hand to rotate the pointer over the speed-limit setup meter. According to another aspect of the present invention, a warning signal device is installed in the meter and adapted to give a warning signal when the indication of the meter surpassed the setup value.

DETAILED DESCRIPTION OF THE EMBODIMENT

Figure 1:
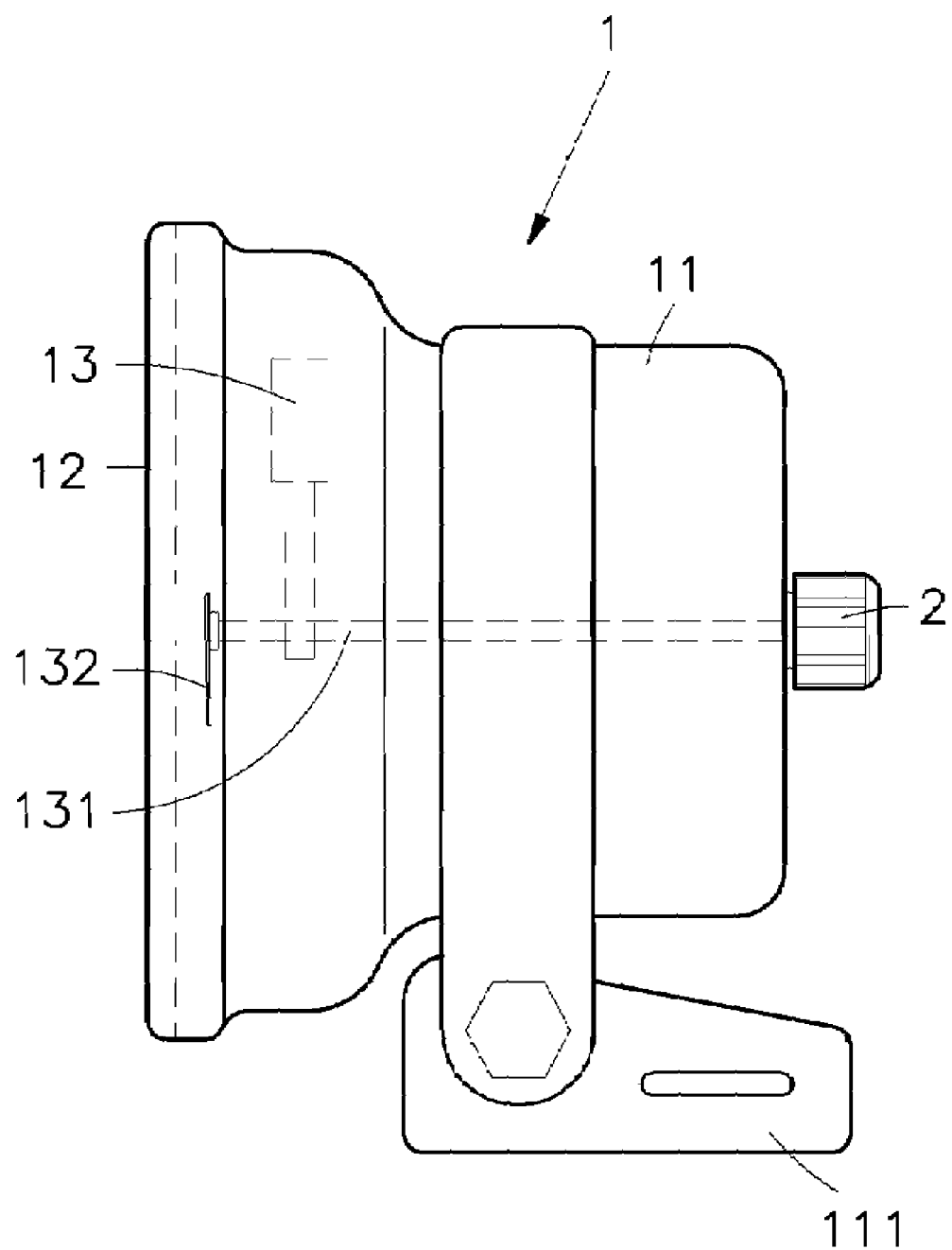
FIG. 1 is a side view of the preferred embodiment of the present invention.
Figure 2:
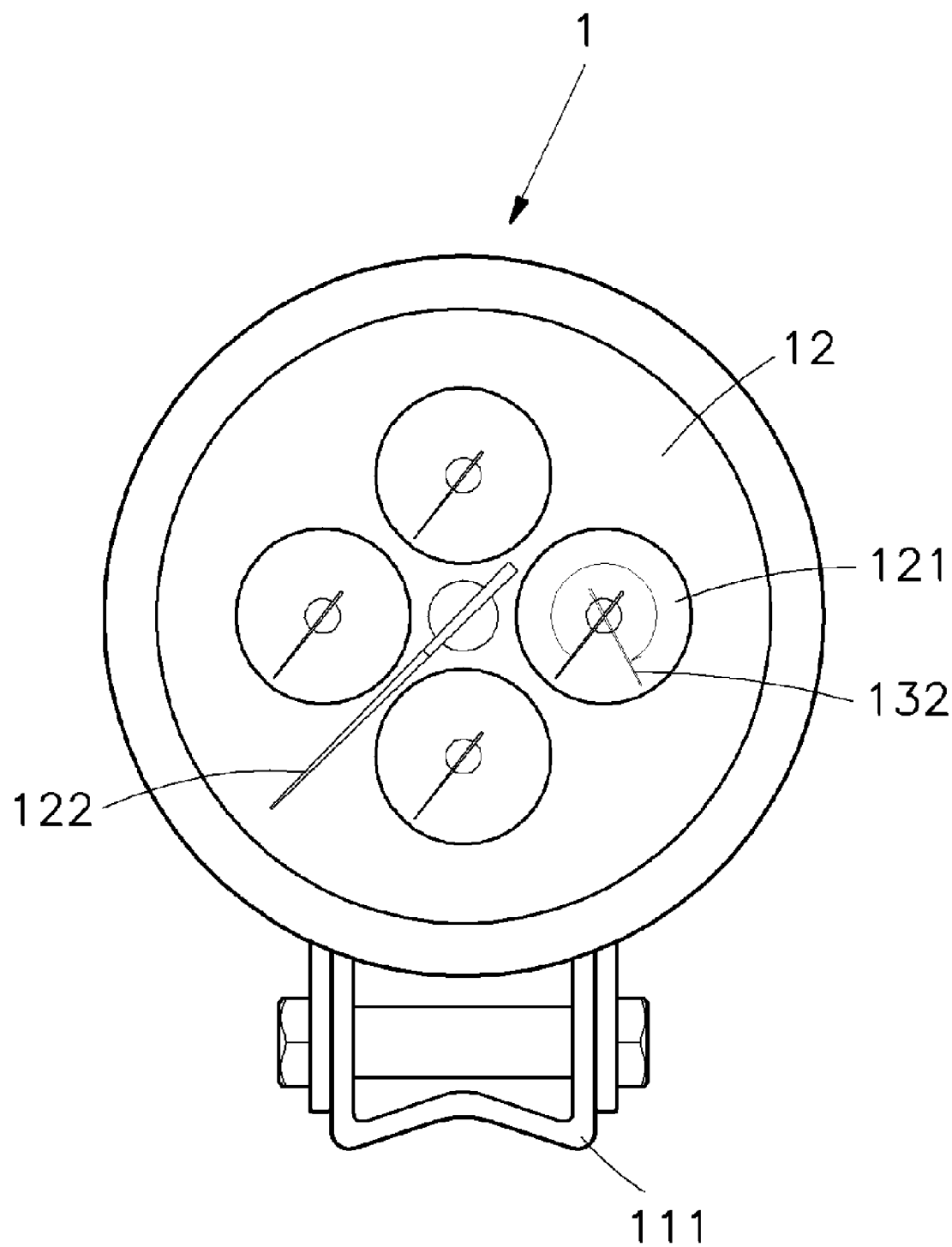
FIG. 2 is a front view of the preferred embodiment of the present invention.

Referring to FIGS. 1 and 2, a speed-limit setup meter in accordance with the present invention is shown comprising a meter 1 and an adjustment device 2. The meter 1 comprises a housing 11, a mounting frame 111 provided at the bottom side of the housing 11 for mounting, a faceplate 12 at the front side of the housing 11 having a speed-limit setup meter 121, a control unit 13 provided inside the housing 11, a link 131 extending across the control unit 13 to the faceplate 12, and a pointer 132 fastened to the front end of the link 131 in proximity to the speed-limit setup meter 121 and turnable with the link 131 relative to the speed-limit setup meter 121. The adjustment device 2 is a knob fixedly fastened to the rear end of the link 131 outside the housing 11 for turning the pointer 132 over the speed-limit setup meter 121 to point out the graduations of a speed-limit setup meter 121 on the faceplate 12.

As indicated above, the adjustment device 2 is suspended outside the back wall of the housing 11 remote from the faceplate 12. When the car driver rotating the adjustment device 2 to move the link 131 and the pointer 132 relative to the speed-limit setup meter 121 to set up the desired speed limit, the user can view the whole area of the speed-limit setup meter 121 without obstruction. Further, because the pointer 132 is kept in proximity to the graduations at the speed-limit setup meter 121, the car driver can see the setup indicated by the pointer 132 at the speed-limit setup meter 121.

Figure 3:
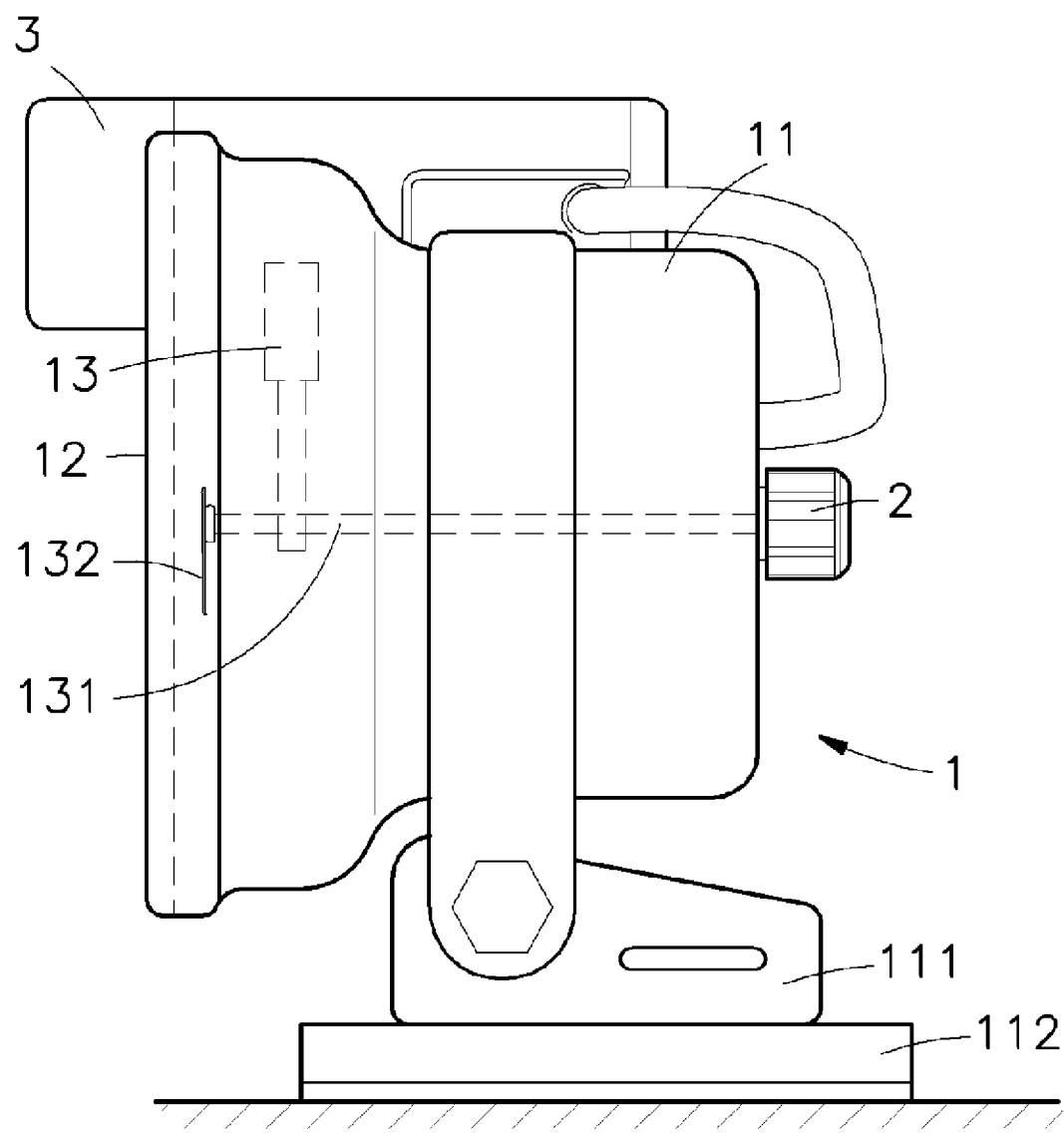
FIG. 3 is a side view of an alternate form of the present invention.
Figure 4:
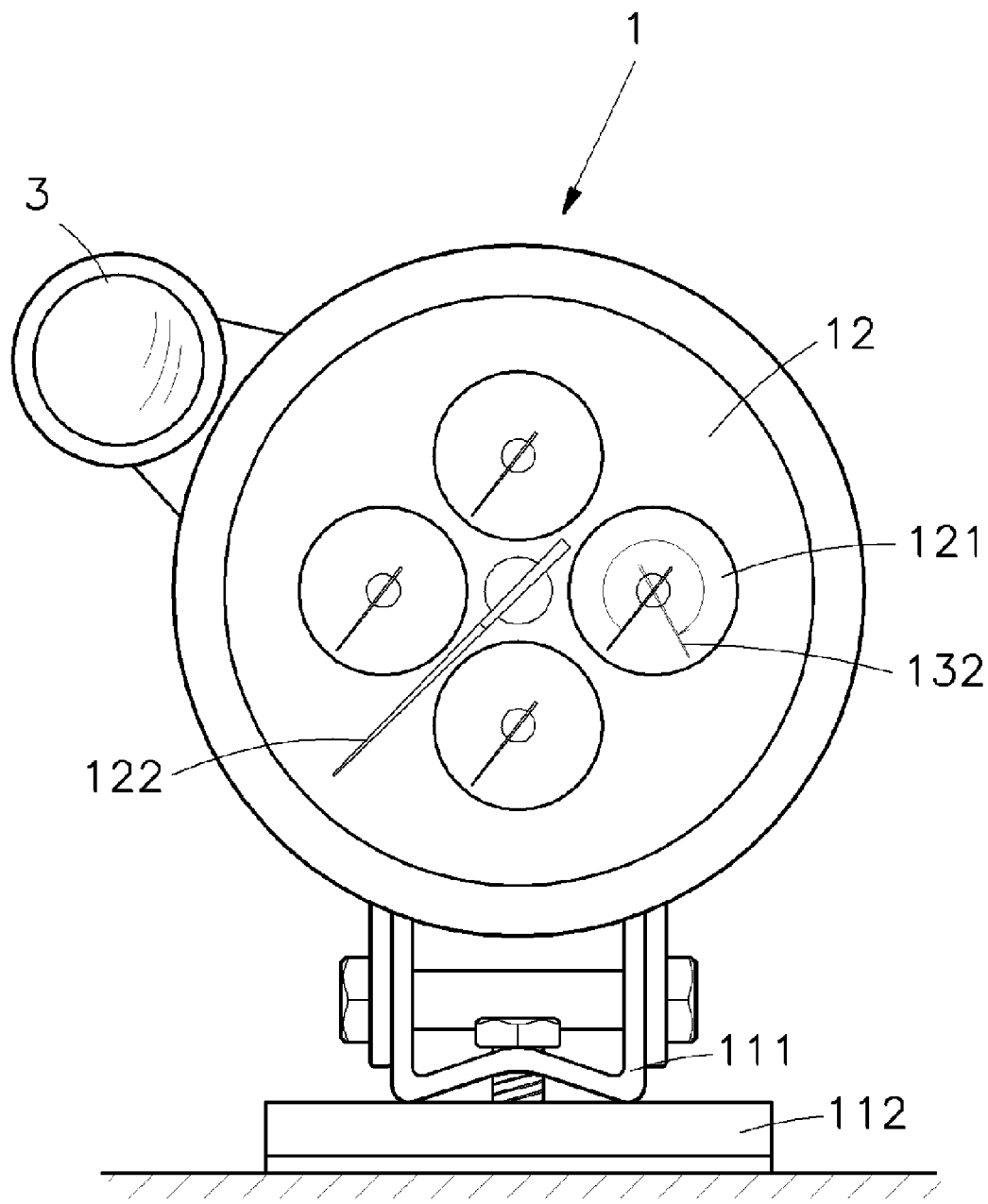
FIG. 4 is a front view of the alternate form of the present invention.
Figure 5:
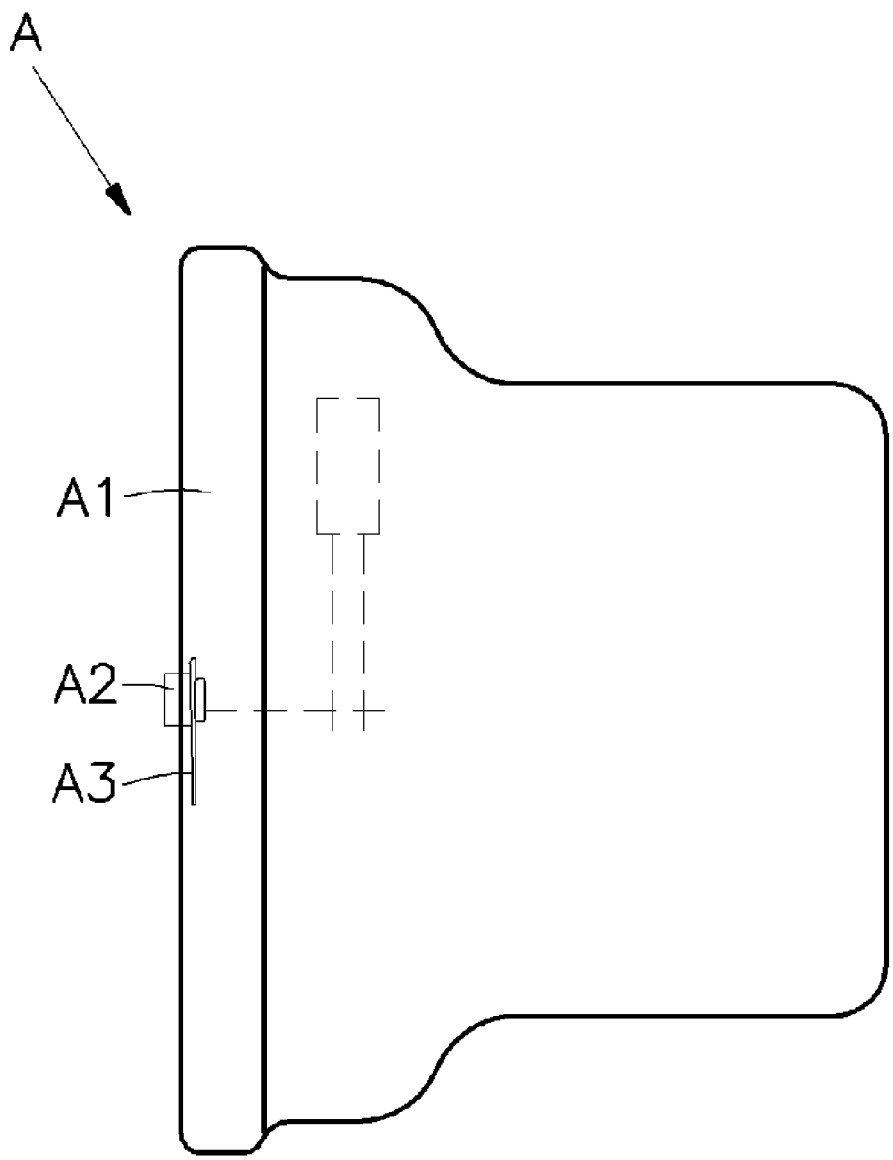
FIG. 5 is a side view of a meter constructed according to the prior art.
Figure 6:
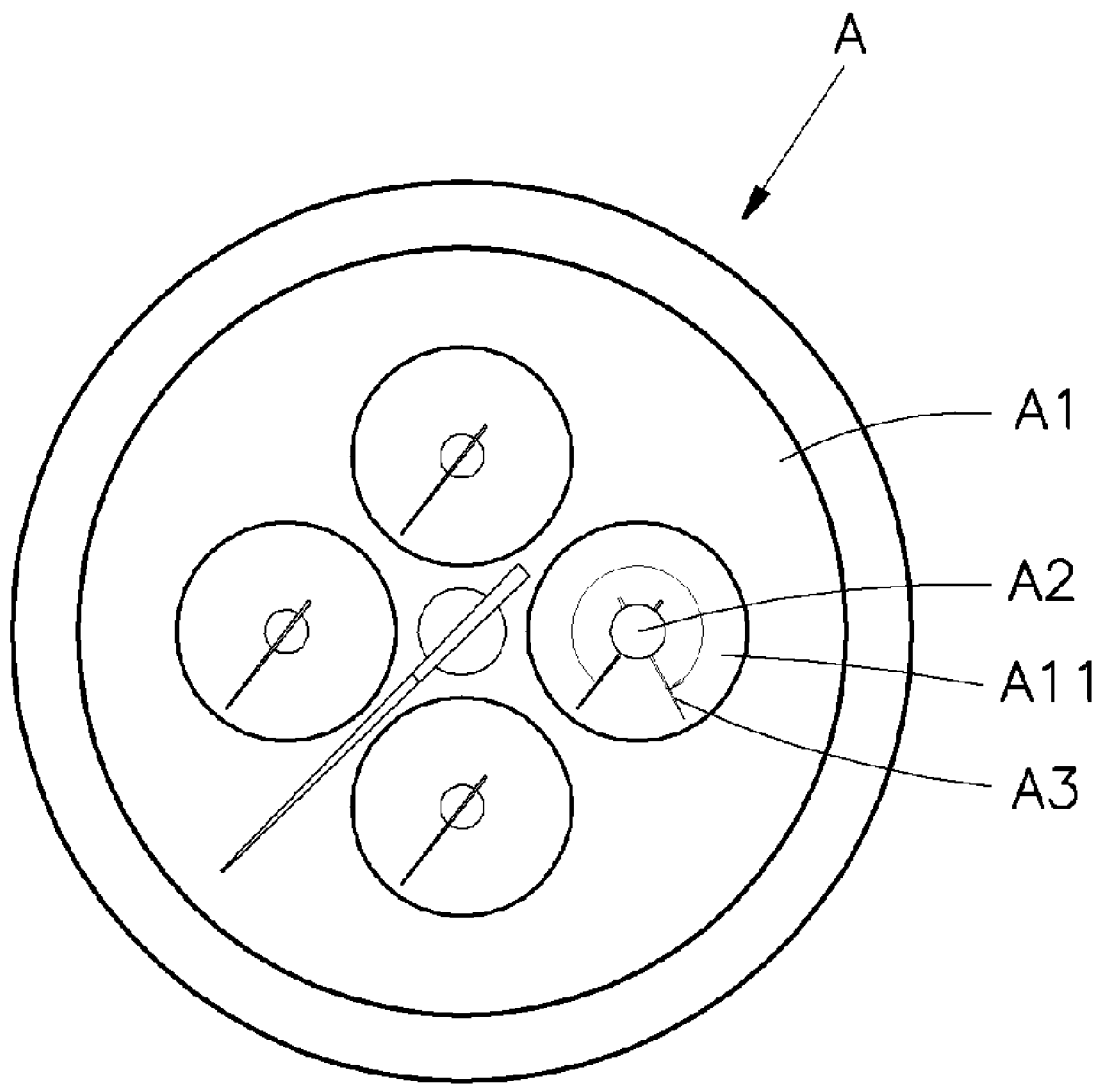
FIG. 6 is a front view of the meter according to the prior art.

FIGS. 3 and 4 show an alternate form of the present invention. According to this embodiment, a warning signal device 3 is installed in the meter 1. When a indication needle 122 of the faceplate 12 passes over the graduation corresponding to the limit speed of the pointer 132 on the speed-limit setup meter 121, the warning signal device 3 is activated to give a warning signal, advising the car driver to slow down the speed.

Further, a flat bottom plate 112 may be fixedly fastened to the bottom side of the mounting frame 111 for fastening to the dashboard of the car with adhesive means, for example, a double-sided adhesive tape (see FIGS. 3 and 4).

As indicated above, the speed-limit setup meter has the following features.

1. The adjustment device is provided at the back side of the meter remote from the faceplate so that the sense of beauty of the faceplate of the meter are maintained intact and, the car driver will not trigger the adjustment device accidentally.

2. When the car driver operating the adjustment device to adjust the setting, the car driver's hand does not hinder the car driver's sight in viewing the indication of the pointer at the speed-limit setup meter.

3. The pointer is kept in proximity to the speed-limit setup meter so that the car driver can see the indication of the pointer at the graduations on the speed-limit setup meter accurately.

A prototype of speed-limit setup meter has been constructed with the features of FIGS. 1~4. The speed-limit setup meter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A speed-limit setup meter comprising a meter, said meter comprising a housing, a mounting frame at a bottom side of said housing, and a faceplate at a front side of said housing, wherein the speed-limit setup meter further comprises a link pivotally mounted inside said housing, said link having a front end extending to the front side of said housing and a rear end extending out of a rear side of said housing, a pointer fixedly fastened to the front end of said link and kept in proximity to said speed-limit setup meter, and an adjustment device fixedly fastened to the rear end of said link for turning with the hand to rotate said pointer over said speed-limit setup meter.

2. The speed-limit setup meter as claimed in claim 1, wherein said mounting frame has a flat bottom plate for mounting.

3. The speed-limit setup meter as claimed in claim 1, further comprising a warning signal device installed in said housing.

* * * * *